United States Patent
Wong et al.

(10) Patent No.: US 8,060,361 B2
(45) Date of Patent: Nov. 15, 2011

(54) COMMUNICATION DEVICE WITH A FUNCTION OF AUDIO MODULATION AND METHOD FOR AUDIO MODULATION

(75) Inventors: Shih-Fang Wong, Taipei Hsien (TW); Chung-Jen Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1003 days.

(21) Appl. No.: 11/927,715

(22) Filed: Oct. 30, 2007

(65) Prior Publication Data

US 2008/0103782 A1    May 1, 2008

(30) Foreign Application Priority Data

Nov. 1, 2006   (CN) .......................... 2006 1 0063416

(51) Int. Cl.
*G10L 19/14*   (2006.01)
(52) U.S. Cl. ........................................................ 704/205
(58) Field of Classification Search ................... 704/205
See application file for complete search history.

(56) References Cited

U.S. PATENT DOCUMENTS

| | | | |
|---|---|---|---|
| 3,681,756 A * | 8/1972 | Burkhard et al. ............. | 704/205 |
| 4,829,565 A | 5/1989 | Goldberg | |
| 5,559,792 A * | 9/1996 | Bottoms et al. ................ | 370/276 |
| 6,813,490 B1 * | 11/2004 | Lang et al. ................. | 455/414.1 |
| 2002/0099538 A1 * | 7/2002 | Saito .............................. | 704/205 |
| 2005/0060154 A1 * | 3/2005 | Kumar .......................... | 704/246 |
| 2006/0233395 A1 * | 10/2006 | Orten ............................ | 381/122 |
| 2007/0058707 A1 * | 3/2007 | Trutna et al. .................. | 375/224 |
| 2007/0162286 A1 * | 7/2007 | Yoon ............................. | 704/277 |

* cited by examiner

*Primary Examiner* — Jakieda Jackson
(74) *Attorney, Agent, or Firm* — Altis Law Group, Inc.

(57) ABSTRACT

A method for audio modulation is provided. The method including: obtaining the digital audio signals of the caller in the process of communications; analyzing the digital audio signals and obtain a voice frequency of the caller; reading a voice frequency of the user from a memory, and calculate the rate of the voice frequencies between the caller and the user; modulating the user' analog audio signals according to the rate of the voice frequencies; converting the modulated analog audio signals into digital audio signals; coding the digital audio signals and modulating the coded digital audio signals and transmitting the modulated digital audio signals to the caller. Through the method, the user's voice is modulated to sound like the caller's voice, thereby increasing the interest of the process of communicating. Present invention also provides a communication device with the function of audio modulation.

8 Claims, 4 Drawing Sheets

COMMUNICATION DEVICE WITH A FUNCTION OF AUDIO MODULATION AND METHOD FOR AUDIO MODULATION

BACKGROUND

1. Technical Field

The present invention relates to a communication device with a function of audio modulation and a method for audio modulation.

2. General Background

The recent trend of communication devices is to increase functionalities to increase their demand and marketability.

One such functionality is a mobile phone which can change the voice of the user. The mobile phone has a voice changing control device and a voice changing circuit. The voice changing control device controls the voice changing circuit to filter voice signals of the user, then change the voice of the user. When utilizing the voice changing functionality, one can change one's voice, for example, during usage of the mobile phone, a male's voice can be changed to sound like a female's voice or an adult voice can change to sound like a child's voice. However, the mobile phone voice changing circuit is not able to change the voice of the caller or receiver to sound like the person on the other end of the line.

Therefore, there is a need to provide a device and a method to change one's voice to sound like the person on the other end of the line, which increase the interest of the process of communicating.

SUMMARY

The present invention provides a communication device with the function of audio modulation and a method for audio modulation, which can convert the voice of the user to sound like the person on the other end of the line (hereinafter "the caller").

A device with the function of audio modulation, the device includes: an antenna, a RF transceiver, a codec, and a control unit (CU) is connected in series, a first Digital-to-analog (D/A) converter and a sound output unit, a microphone, a first analog-to-Digital (A/D) converter, a memory, an audio analysis unit, a frequency-adjusting unit and a switch. The codec, the first D/A converter and the sound output unit is connected in series. The first A/D converter is connected with the codec and the switch connect the microphone with the first A/D converter. The memory connects with the control unit. The audio analysis unit is connected with the codec and the control unit, analyzes digital audio signals of the caller from the codec to obtain a voice frequency of the caller, obtains an voice frequency of a user from the memory, and calculates a rate of the voice frequencies between the caller and the user. The frequency-adjusting unit is connected with the control unit and the first A/D converter, the frequency-adjusting unit modulates the audio signal from the microphone according the rate of the voice frequencies between the caller and the user after the switch is switched to connect the microphone with the frequency-adjusting unit, then the first A/D converter converts the audio signal into digital audio signal, the codec codes the digital audio signals and the RF transceiver modulates the coded digital audio signals, then the audio signals are transmitted to the caller through the antenna.

A method for audio modulation, the method including: obtaining the digital audio signals of the caller in the process of communications; analyzing the digital audio signals and obtain the voice frequency of the caller; reading a voice frequency of the user from a memory, and calculating the rate of the voice frequencies between the caller and the user; modulating the user's analog audio signals according to the rate of the voice frequencies; converting the modulated analog audio signals into digital audio signals; coding the digital audio signals and modulating the coded digital audio signals, and finally transmitting the signals to the caller.

The present invention provides a communication device that can change the voice of the user to sound like the voice of the person on the other end of the line and a method for audio modulation, which increase the interest of the process of communicating.

BRIEF DESCRIPTION OF THE DRAWINGS

The components in the drawings are not necessarily drawn to measuring scale, the emphasis instead being placed upon clearly illustrating the principles of the communication device. Moreover, in the drawings, like reference numerals designate corresponding parts throughout the several views.

DETAILED DESCRIPTION OF THE EMBODIMENT

Figure 1:
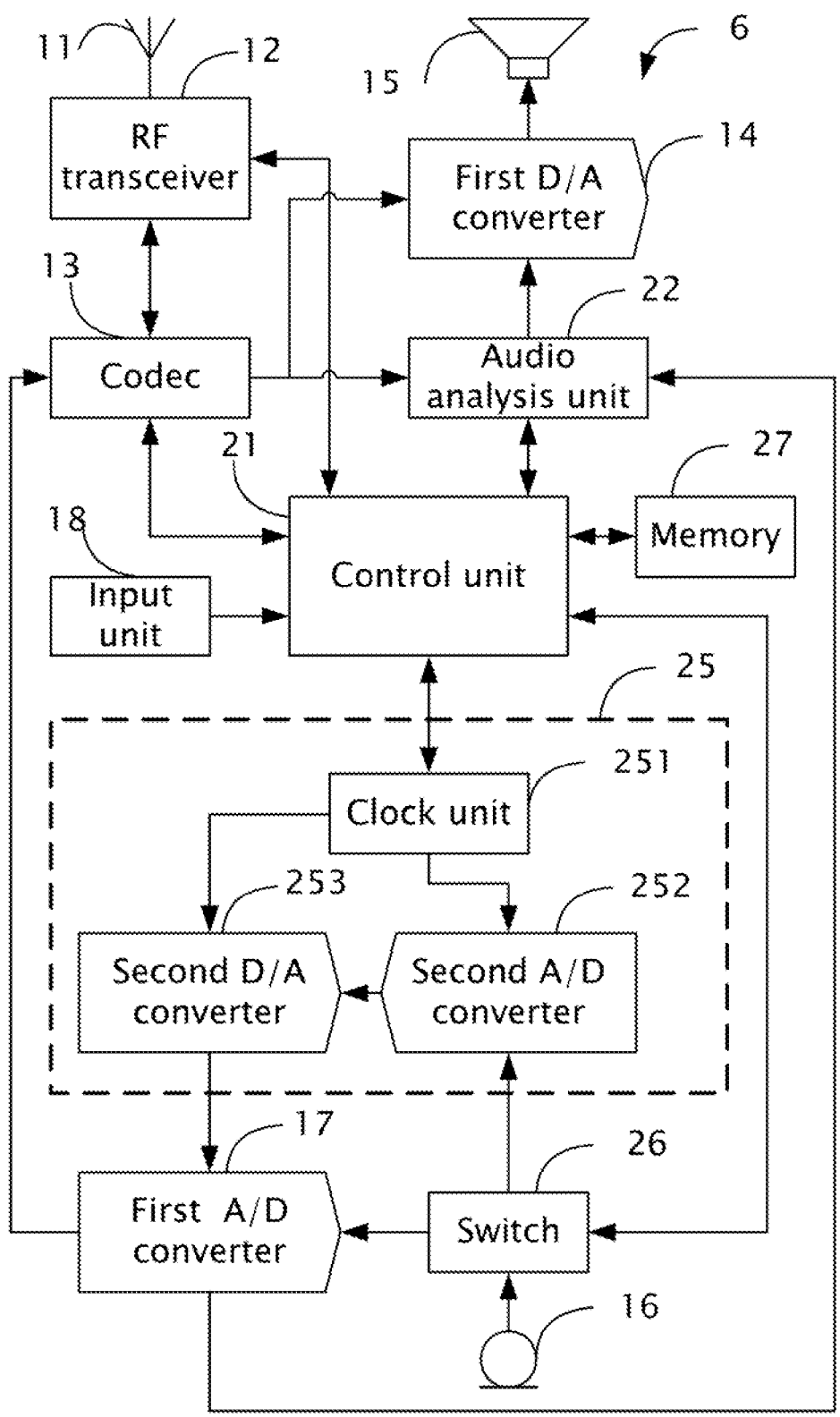
FIG. 1 is a block diagram of hardware infrastructure of a communication device with an audio modulation function in accordance with a preferred embodiment of the present invention.

FIG. 1 is a block diagram of hardware infrastructure of a communication device with an audio modulation function in accordance with a preferred embodiment of the present invention. The communication device 6 includes an antenna 11, a radio frequency (RF) transceiver 12, a codec 13, and a control unit 21. These components are connected in series as shown in FIG. 1. The codec 13 is also connected with a first digital-to-analog (D/A) converter 14 and a sound output unit 15 in series. The sound output unit 15 can be an earphone or a speaker. A first analog-to-digital (A/D) converter 17 is connected with the codec 13, and a switch 26 is connected with a microphone 16. The communication device 6 further includes an input unit 18 that connects with the control unit 21.

The antenna 11 receives wireless communication signals of a person on the other side of the line (hereinafter "the caller"), and transmits the wireless communication signals to the RF transceiver 12. The RF transceiver 12 demodulates the wireless communication signals under control of the control unit 21, and transmits the demodulated wireless communication signals to the codec 13. The codec 13 decodes the wireless communication signals to yield digital audio signals, and transmits the digital audio signals to the first D/A converter 14. The first D/A converter 14 converts the digital audio signals to yield analog audio signals and transmits the analog audio signals to the sound output unit 15. The sound output unit 15 transforms the analog audio signals to a voice of the caller.

The switch 26 is configured for connecting the microphone 16 to the first A/D converter 17 or to the frequency-adjusting unit 25. In the embodiment, the switch 26 is a single pole double throw (SPDT) switch. The control unit 21 controls the switch 26 to either connect the microphone 16 with the first A/D converter 17 or to connect the microphone 16 with the frequency-adjusting unit 25. By default, the switch 26 connects the microphone 16 with the first A/D converter 17.

The microphone 16 receives analog audio signals of the user, and further transmits the analog audio signals to the first A/D converter 17. The first A/D converter 17 converts the analog audio signals into digital audio signals and transmits the digital audio signals to the codec 13. The codec 13 codes the digital audio signals and transmits the coded digital audio signals to the RF transceiver 12. The RF transceiver 12 modulates the coded digital audio signals to high frequency signals, and sends out the high frequency signals through the antenna 11.

The communication device 6 further includes a memory 27, a frequency adjusting unit 25, and an audio analysis unit 22. The memory 27 is connected with the control unit 21. The frequency-adjusting unit 25 is connected with the control unit 21 and the first A/D converter 17. The audio analysis unit 22 is connected with the first A/D converter 17 and the codec 13.

When an audio modulation function (described in a following paragraph) is invoked, the switch 26 connects the microphone 16 and the frequency-adjusting unit 25. The audio analysis unit 22 is connected with the control unit 21 and is configured for obtaining and analyzing the audio signals of the user and the caller, thus obtaining their audio frequency.

The frequency-adjusting unit 25 includes a clock unit 251, a second A/D converter 252, and a second D/A converter 253. The clock unit 251 is connected to the control unit 21, the second A/D converter 252, and the second D/A converter 253. The second A/D converter 252 is also connected to the second D/A converter 253. The second D/A converter 253 is also connected to the first A/D converter 17. The frequency-adjusting unit 25 is used to modulate the user's voice.

Figure 2:
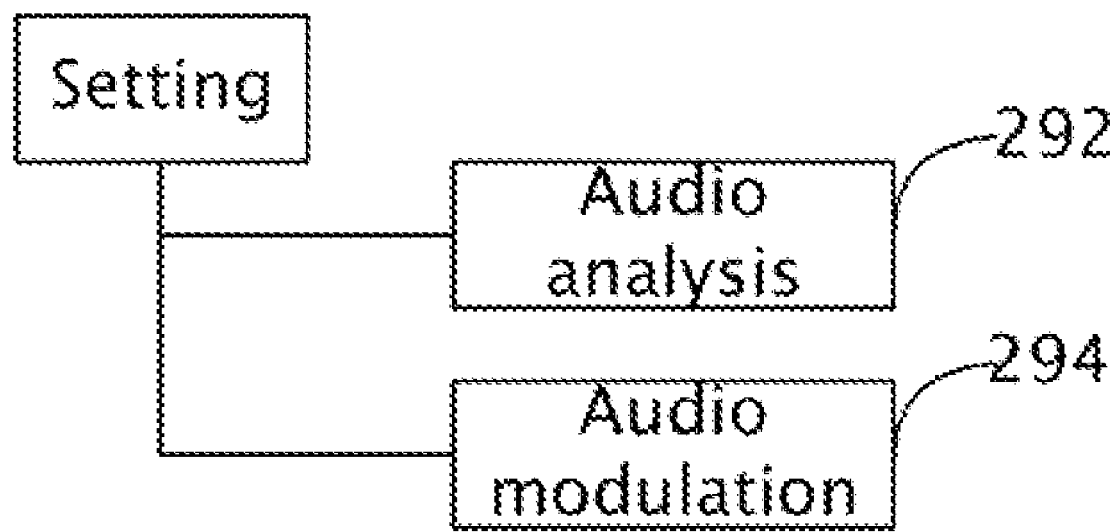
FIG. 2 is a schematic diagram showing sub-menu items of a setting menu item in accordance with a preferred embodiment of the present invention.

FIG. 2 is a schematic diagram showing sub-menu items of a setting menu item in accordance with a preferred embodiment of the present invention. Referring now to FIG. 2, with continued reference to FIG. 1, the communication device 6 has a menu including a plurality of menu items. Each of the menu items is associated with a particular function. For simplicity, in the embodiment, a setting menu item is taken for example. The "setting" menu item includes an "audio analysis" sub-item 292 and an "audio modulation" sub-item 294. The "audio analysis" sub-item 292 is used to invoke the function of audio analysis. The function of audio analysis is used to analyze the user's audio signals.

When the "audio analysis" sub-item 292 is selected, the function of the audio analysis is activated. That is, the control unit 21 controls the audio analysis unit 22 to analyze the user's audio signals. For example, the microphone 16 captures the analog audio signals of the user, the first A/D converter 17 converts the analog audio signals into the digital audio signals, and the control unit 21 controls the audio analysis unit 22 to receive the digital audio signals from the first A/D converter 17. The audio analysis unit 22 analyzes the digital audio signals and obtains a voice frequency of the user, then stores the voice frequency in the memory 27. The user could activate the function of the audio analysis anytime (e.g. in the process of communicating or not communicating) by selecting the "audio analysis" sub-item 292. Once the function of audio modulation is activated, the control unit 21 executes the function of audio modulation automatically during a communication between the user and the caller.

When the "audio modulation" sub-item 294 is selected, the control unit 21 controls the audio analysis unit 22 to obtain digital audio signals of the caller from the codec 13. The audio analysis unit 22 analyzes the digital audio signals and obtains a voice frequency of the caller. The audio analysis unit 22 further obtains the voice frequency of the user from memory 27, and calculates a rate of the voice frequencies of the caller and the user. The control unit 21 controls the switch 26 to disconnect the connection between the microphone 16 and the first A/D converter 17 and switch to connect the microphone 16 with the frequency-adjusting unit 25. The control unit 21 controls the frequency-adjusting unit 25 to modulate the audio signals from the microphone 16 according to the rate of the voice frequencies between the caller and the user. The frequency-adjusting unit 21 transmits the modulated audio signals to the caller through the first A/D converter 17, the codec 13, the RF transceiver 12, and the antenna 11.

The process of the frequency-adjusting unit 25 to modulate the audio signals under the control of the control unit 21 is described as following. The control unit 21 controls the clock unit 251 to set a frequency of the second A/D converter 252 to a predetermined frequency X and to set a frequency of the second D/A converter 253 to R*X, R is the rate of the voice frequencies between the caller and the user. The second A/D converter 252 converts the analog audio signals of the user into the digital audio signals according to the predetermined frequency X, and the second D/A converter 253 converts the digital audio signals according to the frequency R*X. Thus, through the second A/D converter 252 and the second D/A converter 253, the converted voice frequency of the user becomes R times the original voice frequency of the user, thereby having the modulated user's voice at the same frequency as that of the caller.

The communication device 6 further provides hotkeys for directly invoking the "audio analysis" sub-item 292 and the "audio modulation" sub-item 294. For example, a combination of a key "*" and a key "2" is assigned as the hotkey for activating the function of audio analysis, while a combination of the key "*" and a key "3" is assigned as the hotkey for activating the function of audio modulation.

Figure 3:
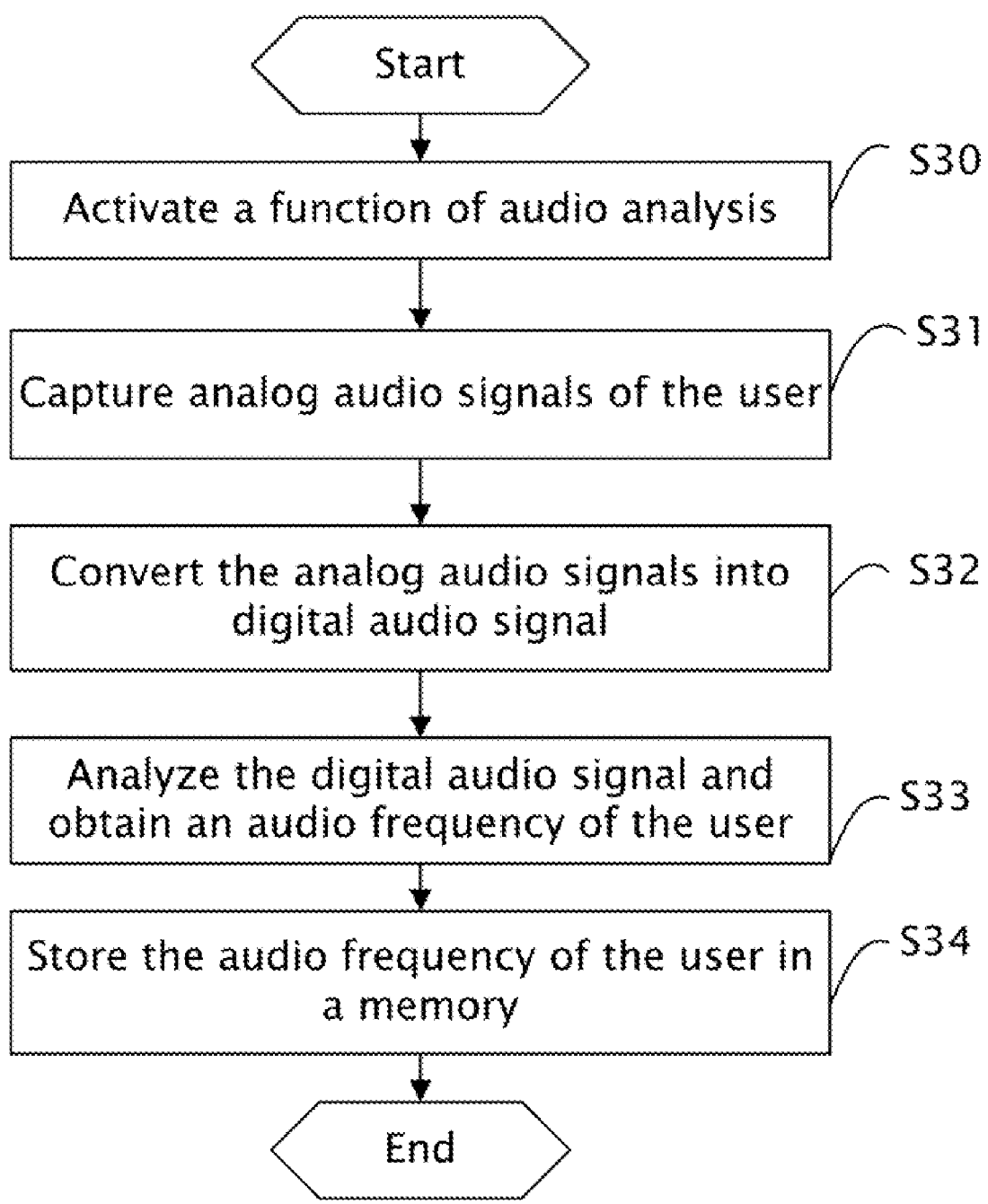
FIG. 3 is a flow chart illustrating a preferred audio analyzing method in accordance with a preferred embodiment of the present invention.

FIG. 3 is a flow chart illustrating an audio analyzing method in accordance with a preferred embodiment of the present invention. In step S30, when an operation on the hotkey or a selection of the "audio analysis" sub-item 292 in the menu items is performed to activate the function of the audio analysis, the control unit 21 controls the switch 16 to switch to connect the microphone 16 with the first A/D converter 17.

In step S31, the microphone 16 captures the analog audio signals of the user and transmits a captured analog audio signals to the first A/D converter 17.

In step S32, the first A/D converter 17 converts the analog audio signals to the digital audio signals and transmits the digital audio signals to the codec 13.

In step S33, the control unit 21 controls the audio analysis unit 22 to receive and analyze the digital audio signals from the first A/D converter 17, thus to obtain the voice frequency of the user.

In step S34, the audio analysis unit 22 stores the voice frequency of the user in the memory 27.

Figure 4:
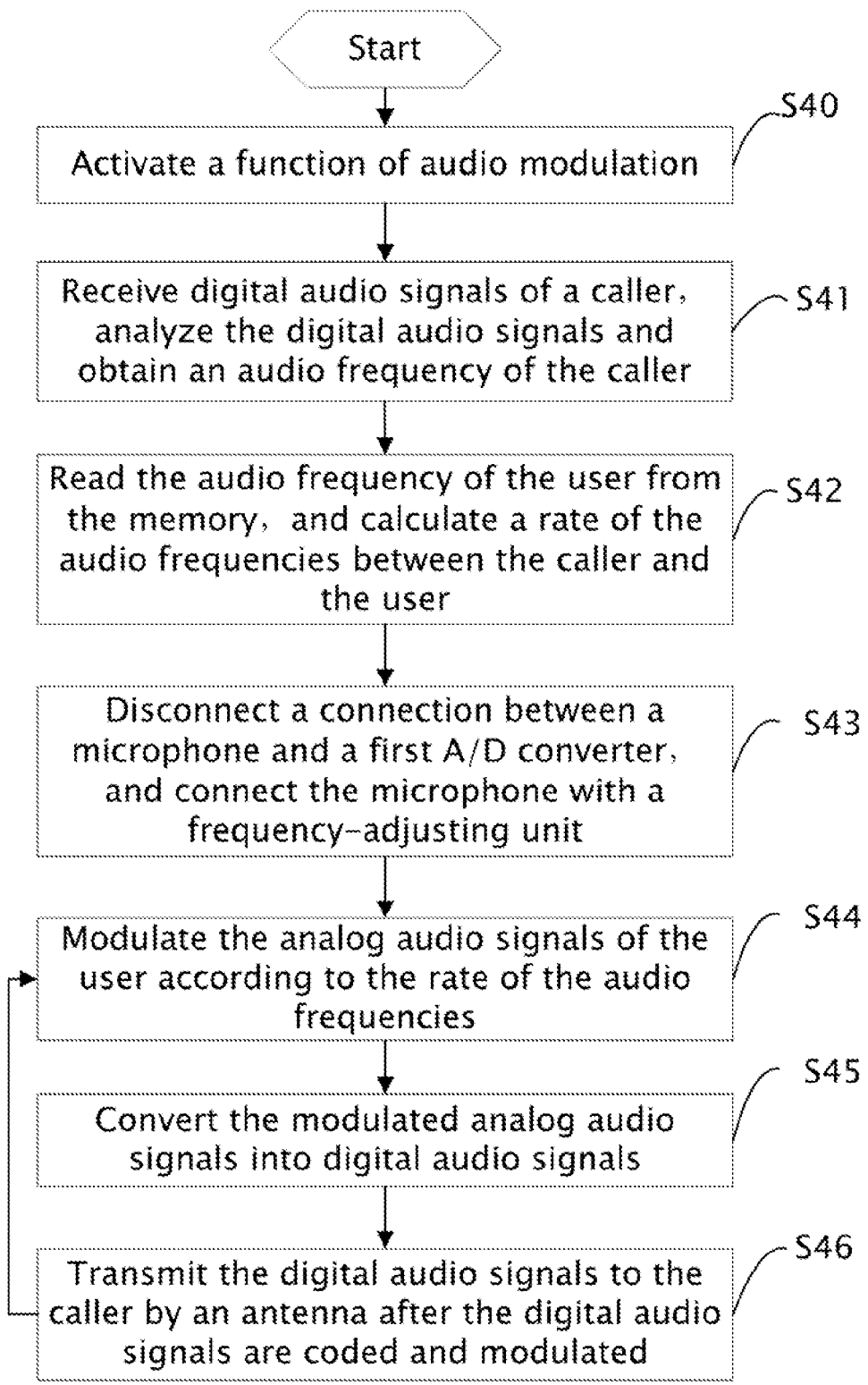
FIG. 4 is a flow chart illustrating a preferred audio modulation method in accordance with a preferred embodiment of the present invention.

FIG. 4 is a flow chart illustrating an audio modulation method in accordance with a preferred embodiment of the present invention. In step S40, the control unit 21 activates the function of the audio modulation in response to an operation on the corresponding hotkey or selects the "audio modulation" sub-item 294 in the menu items.

In step S41, the audio analysis unit 22 receives the digital audio signals of the caller from the codec 13 and analyzes the digital audio signals to obtain the voice frequency of the caller under the control of the control unit 21.

In step S42, the audio analysis unit 22 obtains the voice frequency of the user from memory 27, and calculates the rate of the voice frequencies between the caller and the user.

In step S43, the control unit 21 controls the switch 16 to switch the connection to the microphone 16 and the second A/D converter 252.

In step S44, the control unit 21 controls the frequency-adjusting unit 25 to modulate the audio signals of the user captured by the microphone 16 according to the rate of the voice frequencies between the caller and the user. Typically, the control unit 21 controls the clock unit 251 to set the frequency of the second A/D converter 252 as the predetermined frequency X and to set the frequency of the second D/A converter 253 as R*X. The second A/D converter 252 converts the analog audio signals of the user into digital audio signals according to the predetermined frequency X; and the second D/A converter 253 converts the digital audio signals into analog audio signals according to the frequency R*X, wherein R is the rate of the voice frequencies between the caller and the user.

In step S45, the first A/D converter 17 converts the modulated audio signals into the digital audio signals.

In step S46, the codec 13 codes the digital audio signals, the RF transceiver 12 modulates the coded digital audio signals and transmits the modulated digital audio signals to the caller through the antenna 11.

The steps S44-S46 are repeated until the communication between the user and the caller is ended.

In addition, when the function of "audio modulation" is disabled or the communication between the user and the caller is ended, the control unit 21 controls the switch 26 to switch the connection to the microphone 16 and the first A/D converter 17.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A communication device with an audio modulation function, the communication device comprising:
    an antenna, a RF transceiver, a codec, and a control unit connected in series, a first Digital-to-analog (D/A) converter and a sound output unit, a microphone, a first analog-to-Digital (A/D) converter, a memory, an audio analysis unit, a frequency-adjusting unit and a switch, wherein:
    the codec, the first D/A converter and the sound output unit is connected in series;
    the first A/D converter is connect with the codec;
    the switch is controlled to either connect the microphone with the first A/D converter or to connect the microphone with the frequency-adjusting unit;
    the memory is connected with the control unit;
    the audio analysis unit is connected with the codec and the control unit, the audio analysis unit analyzes digital audio signals of a caller, from the codec, to obtain a voice frequency of the caller, obtains a voice frequency of a user from the memory, and calculates the rate of the voice frequencies between the caller and the user; and
    the frequency-adjusting unit is connected with the control unit and the first A/D converter, the frequency-adjusting unit modulates audio signals from the microphone according to the rate of the voice frequencies between the caller and the user after the switch is switch to connect the microphone with the frequency-adjusting unit;
    the first A/D converter converts the audio signals into digital audio signals;
    the codec codes the digital audio signals and the RF transceiver modulates the coded digital audio signals and transmits the modulated audio signals to the caller through the antenna.

2. The communication device of claim 1, wherein the audio analysis unit is further connected with the first A/D converter, analyzes digital audio signals of the user from the first A/D converter to obtain the user's voice frequency, and stores the user' voice frequency in the memory.

3. The communication device of claim 1, wherein the switch is a single pole double throw (SPDT) switch, the switch is controlled to connect the microphone with the first A/D converter by default, only in an audio modulation process, the switch is controlled to connect the microphone with the frequency-adjusting unit.

4. The communication device of claim 1, wherein the frequency-adjusting unit comprises: a clock unit which connects with the control unit; a second A/D converter which connects with the switch and the clock unit; a second D/A converter which connects with the clock unit and the second A/D converter; the clock unit sets a frequency of the second A/D converter as a predetermined frequency X and sets a frequency of the second D/A converter as R*X under the control of control unit, wherein R is the rate of the voice frequencies between the caller and the user.

5. The device of claim 4, wherein the second A/D converter receives the analog audio signals of the user captured by the microphone, and converts the analog audio signals into the digital audio signals according to the frequency X, transmits the digital audio signals to the second D/A converter; the second D/A converter converts the digital audio signals into analog audio signals according to the frequency R*X, and transmits the analog audio signals to the first A/D converter.

6. A method for audio modulation of communication, comprising:
    obtaining digital audio signals of a caller;
    analyzing the digital audio signals and obtaining an audio frequency of the caller;
    reading a voice frequency of a user from a memory, and calculating a rate of the voice frequencies between the caller and the user;
    modulating analog audio signals of the user according to the rate of the voice frequencies;
    converting the modulated analog audio signals into digital audio signals; and
    coding the digital audio signals and modulating the coded digital audio signals; and
    transmitting the modulated digital audio signals to the caller.

7. The method of claim 6, further comprising:
    converting analog audio signals of the user into digital audio signals;
    analyzing the digital audio signals and obtaining the voice frequency of the user; and
    storing the voice frequency of the user in the memory.

8. The method of claim 6, wherein modulating analog audio signals of the user according to the rate of the voice frequencies further comprises:
    converting the analog audio signals of the user into digital audio signals according to a predetermined frequency X; and
    converting the digital audio signals into analog audio signals according to a frequency R*X, R is the rate of the voice frequencies between the caller and the user.

* * * * *